United States Patent [19]

Polites et al.

[11] Patent Number: 5,443,247
[45] Date of Patent: Aug. 22, 1995

[54] TUNEABLE ROTATING UNBALANCED MASS DEVICE

[75] Inventors: Michael E. Polites; Dean C. Alhorn, both of Huntsville, Ala.

[73] Assignee: The United States of America as represented by the Administrator, National Aeronautics and Space Administration, Washington, D.C.

[21] Appl. No.: 246,460

[22] Filed: May 20, 1994

[51] Int. Cl.⁶ .......................... B64G 1/66; F16F 1/14
[52] U.S. Cl. .......................... 267/283; 244/158 R; 267/154; 267/160
[58] Field of Search .......... 267/154, 162, 262, 283, 267/273; 244/158 R, 171, 172, 173

[56] References Cited

U.S. PATENT DOCUMENTS

| | | | |
|---|---|---|---|
| 2,238,380 | 4/1941 | Almen | 267/283 |
| 2,950,103 | 8/1960 | Ruf | 267/283 |
| 3,207,497 | 9/1965 | Schoonover | 267/283 |
| 5,129,600 | 7/1992 | Polites | 244/158 R |

Primary Examiner—Matthew C. Graham
Attorney, Agent, or Firm—Robert L. Broad, Jr.; Guy M. Miller; Alan J. Kennedy

[57] ABSTRACT

In a torsion spring the spring action is a result of the relationships between the torque applied in twisting the spring, the angle through which the torsion spring twists, and the modulus of elasticity of the spring material in shear. Torsion springs employed industrially have been strips, rods, or bars, generally termed shafts, capable of being flexed by twisting about their axes. They rely on the variations in shearing forces to furnish an internal restoring torque. In the torsion springs herein the restoring torque is external, and therefore independent of the shearing modulus of elasticity the torsion spring shaft. Also provided herein is a variable stiffness torsion spring. This torsion spring can be so adjusted as to have a given spring constant. Such variable stiffness torsion springs are extremely useful in gimballed payloads such as sensors, telescopes and electronic devices on such platforms as a space shuttle, a space station.

9 Claims, 3 Drawing Sheets

TUNEABLE ROTATING UNBALANCED MASS DEVICE

ORIGIN OF THE INVENTION

The invention described herein was made by employees of the United States Government and may be manufactured and used by or for the Government of the United States of America for Governmental purposes without payment of any royalties thereon or therefor.

FIELD OF THE INVENTION

This invention, in one of its aspects, pertains to torsion springs. In another of its aspects the invention is directed to variable stiffness torsion springs. In still another of its aspects the invention relates to gimballed scanning devices or instruments focused on objects in or from outer space, specifically, with instruments whose scanning is produced by rotating unbalanced mass devices.

BACKGROUND OF THE INVENTION

A torsion spring is an elastic element capable of being flexed by twisting about its axis. The spring action, or spring constant, is primarily a result of the relationships between the torque applied in twisting the spring, the angle through which the torsion spring twists, and the modulus of elasticity of the spring material in shear. The twisting action on a torsion spring is produced by couples, that is, two equal forces producing partial rotation by moving in parallel but opposite directions and acting normal to the axis of the shaft.

As we understand the state of the art, torsion springs employed industrially have been strips, rods, or bars, generally termed shafts, usually with square, elliptical, rectangular, circular, or triangular cross-sections. As such they are used in machines, passenger cars and trucks. Tubular members find application in aircraft and the like. Shear stresses are assumed uniform over the tube wall thickness. Cylindrical bars can be visualized as helical springs with a resisting torque equal to applied torque. When non circular shafts are twisted, their sections become warped and stresses do not vary linearly as in the case of shafts having circular cross-sections.

Torsion springs have been used as springs for years, generally in the form of torsion bars. There is, then, a need for a different type of torsion spring, especially for such uses as scanning devices which are extensively employed in space research. In addition to their use in scanning the earth and other planets, x-ray, gamma-ray, and similar scanning instruments perform important functions in space exploration. As will become apparent the torsion springs of this invention lend themselves to such usage.

By another embodiment of this invention a variable stiffness torsion spring is provided. In other words a torsion spring can be made which can be so adjusted as to have a given spring constant. These torsion springs are extremely useful in gimballed payloads such as sensors, telescopes and electronic devices on such platforms as a space shuttle, a space station, on experimental balloons, and on free-flying spacecraft. As will be seen, variable stiffness torsion springs are particularly useful in scientific instruments in which scan patterns are achieved through the use of rotating unbalanced masses. Such rotating unbalanced mass (RUM) devices are the subject of our U.S. Pat. No. 5,129,600 and our copending patent application Ser. No. 08/123,629 now U.S. Pat. No. 5,396,815 filed Sep. 15, 1993. As will be explained, the adjustable spring constant torsion springs provided herein eliminate the need for installing a different torsion spring in a scanning instrument when the scan frequency is changed.

SUMMARY OF THE INVENTION

Known torsion springs rely on variations in shearing forces thereacross to furnish an internal restoring torque. In the torsion springs of this invention the restoring torque is external, and therefore independent of the shearing modulus of elasticity the torsion spring shaft. An external spring is used having one end attached to the periphery of the shaft and having its opposite end anchored. The spring is so disposed that during the partial rotation of the shaft, it moves through a torsional angle dependent on the spring constant rather than on the shear modulus of elasticity of the shaft.

A variable stiffness torsion spring is also provided herein. It includes a modification of the external spring torsion device, or the conventional shaft type capable of being twisted about its longitudinal axis by an input torque. The shaft type is a torsion spring member with a restoring torque which is a function of shaft length, cross-sectional area and modulus of elasticity in shear. The variable stiffness torsion spring includes a slidable constraint capable of confining the shaft or the external springs, and means anchoring the constraint so that the constraint prevents a portion of the shaft or of the springs from flexing. In other words the constraint changes the effective length of the shaft or springs and consequently the torsion spring constant.

THE INVENTION

We have noted that unique torsion springs, along with novel variable stiffness torsion springs are the subject of this invention. The invention can, it is believed, best be understood from a discussion thereof in conjunction with drawings illustrating various features of the torsion springs and their uses.

DETAILED DESCRIPTION OF THE INVENTION

As previously indicated, in torsion springs heretofore variations in shearing forces provided internal restoring torques. Herein, on the other hand, the restoring torque is external. One form of such a torsion spring is illustrated as 2 in FIG. 1. In this device the shaft or torsion bar 4 is twisted about its axis as a torque is applied. Normally the twist of such a cylindrical bar can be visualized as the accumulated rotational displacement of imaginary disks over a section of the bar or shaft. Shearing forces vary across the section and together furnish the internal resisting torque. Herein, however, flat springs 6 and 8 are attached to shaft 4 at a and b. These springs 6 and 8 can be welded to the shaft at a and b, or the end of shaft 4 can be provided with a slot through which a long flat spring passes. The spring can then be pinned to the shaft by a suitable pin means.

The outer ends of springs 6 and 8 are slidably held in standards or blocks 10 and 12. The blocks are stationary or fixed to some base (not shown) so as to anchor the springs.

Figure 3:
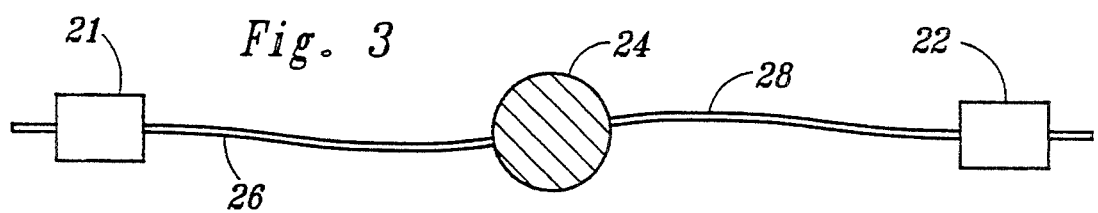
FIG. 3 is a diagrammatic view showing either of the torsion springs (FIG. 1 or FIG. 2) in a stressed condition.

It can be seen that a torque applied to the shaft will cause the springs 6 and 8 to flex as shown in FIG. 3. Since the outer ends of these springs 6 and 8 are confined by the slots in blocks 10 and 12 the springs will resist this flexure, conferring on shaft 4 a resisting torque which in this instance is external, and proportional to the angle of rotation of shaft 4. The torsion spring illustrated in FIG. 1 is, therefore, independent of the shearing modulus of elasticity of the torsion spring shaft, in this case shaft 4, because the shaft 4 is much stiffer in torsion than the springs 6 and 8 in bending.

It has been pointed out that as embodiment of this invention variable stiffness torsion springs are provided. Such a spring will now be described with reference to FIG. 2. The torsion spring 20 is similar to torsion spring 2 illustrated in FIG. 1, except that anchors 10 and 12 are no longer used. A shaft 24, similar to shaft 4 of FIG. 1, is shown, along with springs 26 and 28 which confer on shaft 24 a resisting torque. Rather than anchor blocks 10 and 12, constraints 21 and 22 are employed, and springs 26 and 28 pass through slots in these constraints. In torsion spring 20 constraints 21 and 22 are so mounted that they also cause springs 26 and 28 to flex as shown in FIG. 3. One such mounting means can be a support beam 23 shown in FIG. 2. This beam is attached near its center to a stand or stanchion with the ends of the beam passing through slots in constraints 21 and 22 similar to those provided for springs 26 and 28. As in the torsion spring of FIG. 1, the springs in FIG. 2 provide a restoring torque counteracting shaft angular deflection. This restoring force is determined by the effective torsional spring constants of springs 26 and 28 in the system shown in FIG. 1.

Figure 1:
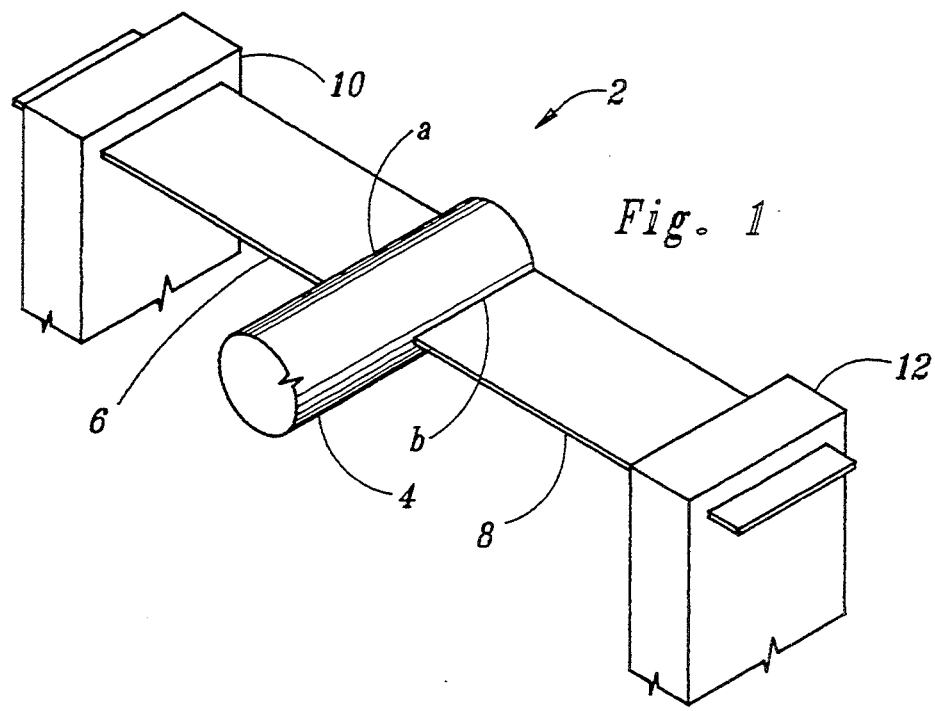
FIG. 1 is an isometric view of a unique torsion spring.
Figure 2:
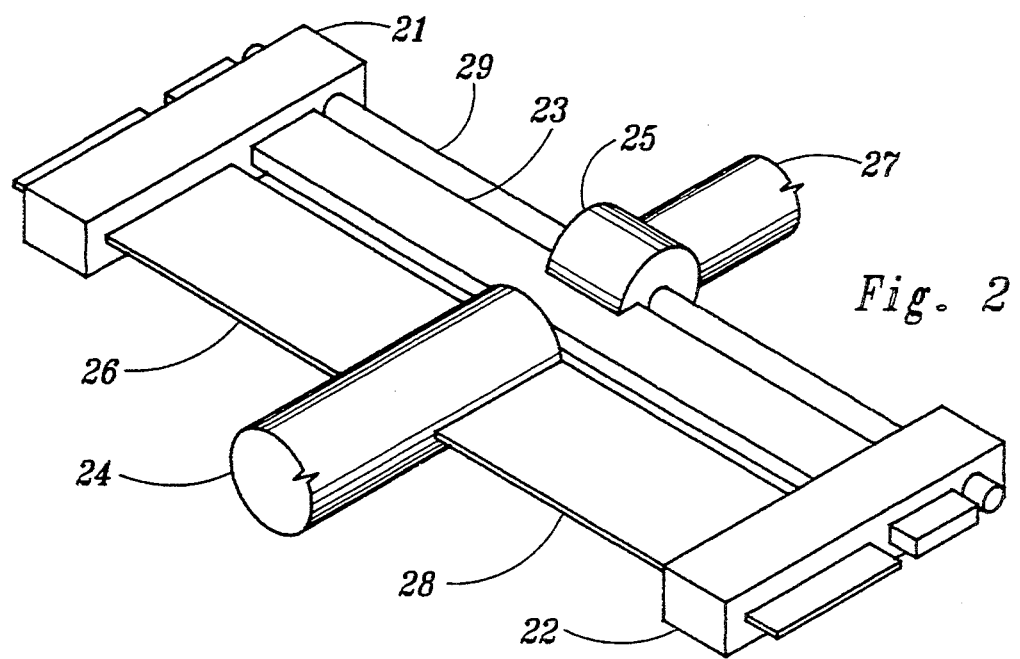
FIG. 2 is an isometric view of a variable stiffness torsion spring.

It has been emphasized that one of the determinants affecting the torsional spring constant in the system in FIG. 1 is spring length. It will be shown that the lengths of springs 26 and 28 can be changed in the torsion spring illustrated in FIG. 2. Support beam 23 carries a differential spur gear 25 capable when driven by drive shaft 27 of rotating a traverse rod or worm screw 29. The ends of worm screw 29 are oppositely threaded, and these threaded ends are confined in matching threads in constraints 21 and 22 as can be seen in FIG. 2. Referring to that figure, it will be apparent that as the traverse rod 29 is rotated by differential spur gear 25 the constraints 21 and 22 will be moved toward or away from each other, depending upon whether the rotation of worm screw 29 is clockwise or counterclockwise. As constraints 21 and 22 move toward or away from each other, stabilized by support beam 23, they will change the lengths of springs 26 and 28. As the lengths of these springs change, so will the effective torsion spring constants of the system. A variable stiffness torsion spring is, thus, one of the features of this invention.

Figure 4:
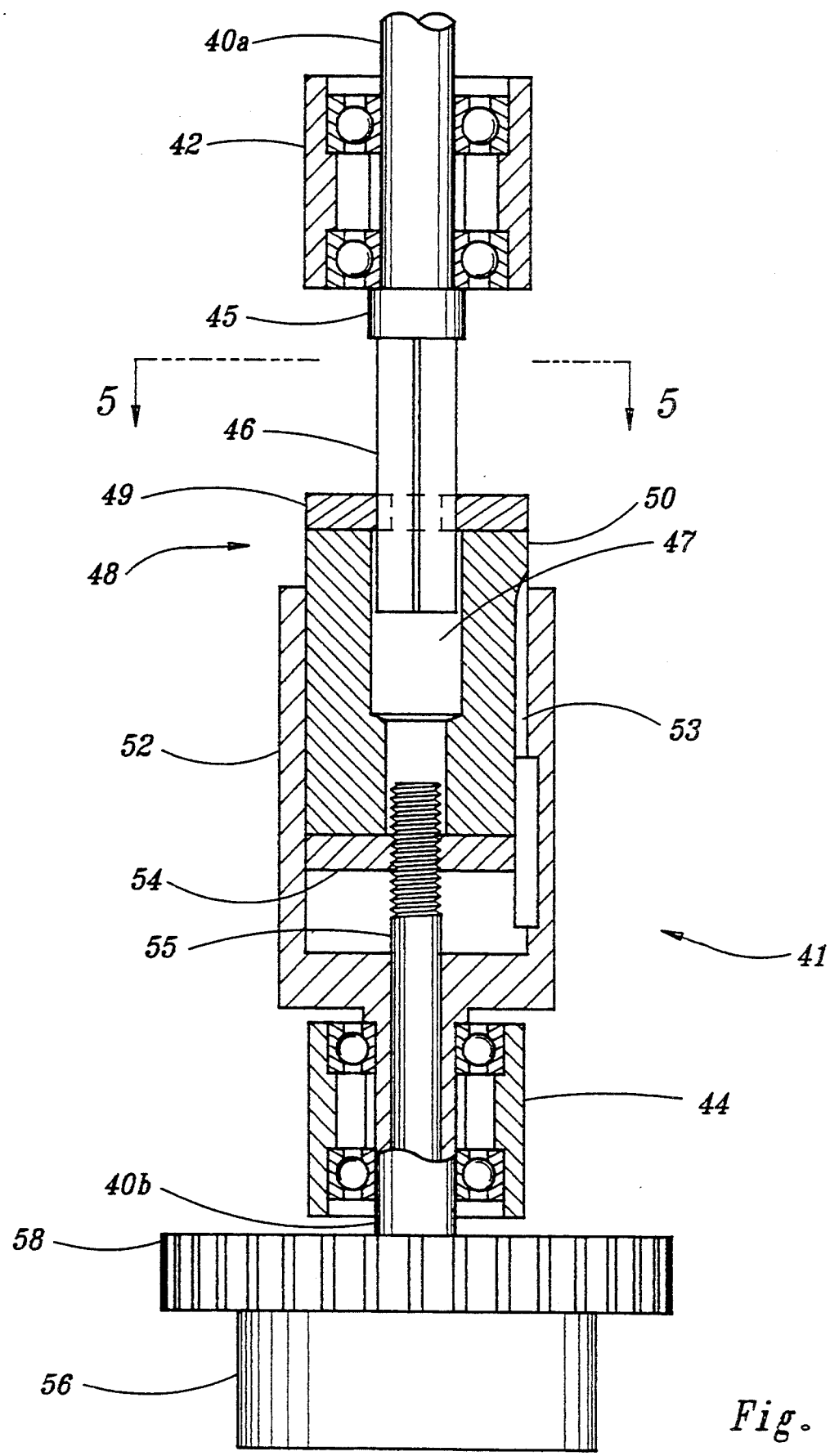
FIG. 4 is a view, partially in section, of a conventional torsion spring converted by this invention to a variable stiffness torsion spring.
Figure 5:
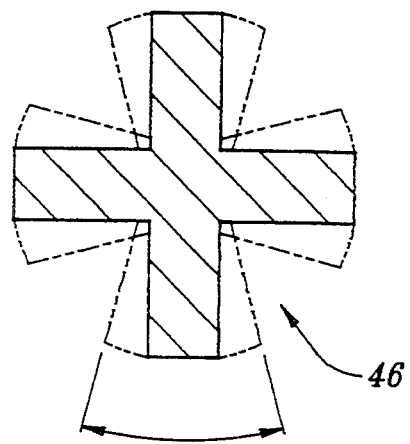
FIG. 5 is a sectional view through 5—5 of FIG. 4.

A variable stiffness torsion spring which is somewhat more conventional is illustrated in FIG. 4. This spring 41 is deemed to be more conventional because it includes a shaft 40 whose resisting torque is the moment of the internal shear forces about the axis of torsion spring element 46. This torsion spring element 46 is in the form of a cruciform spring as illustrated in FIG. 4, and shown in cross-section in FIG. 5, and it is made of metal or rubber. The torsion spring element (46) thus is part of shaft 40 consisting of shaft portion 40a, torsion spring element 46, constraint 48 and shaft portion 40b. Shaft portions a and b are mounted in bearings 42 and 44 as can be seen in FIG. 4. One end of torsion spring element 46 is, thus, attached to shaft portion 40a through plate 45 to which the spring element is attached. The other end of torsion spring element 46 is coaxial with, and attached to, boss 47. Boss 47 is slidable within a constraint 48. Essentially then torsion spring 46 is positioned in a cruciform hole in boss 47 which is slidable within constraint 48. Constraint 48 includes restraining plate 49, a cylinder 50, a collar 52 and a spindle 55. Restraining plate 49 is provided with a cruciform hole matching, in cross-section, the cruciform torsion spring element so that the cruciform spring is slidable therein. The restraining plate is attached to a cylinder 50 which is provided with a cavity adapted to receive boss 47. Cylinder 50 is locked in a sleeve or collar 52 by means of key (not shown) in slot 53. The collar is anchored (by means not shown) so that the cylinder and attached restraining plate 49 cannot be rotated. Cylinder 50 and restraining plate 49 are, however, able to be moved axially across torsion spring element 46. To move restraining plate 48 a threaded base plate 54 is attached to the end of cylinder 50 opposite restraining plate 49. Within threaded base plate 54 is a spindle 55, which when rotated, advances or retracts cylinder 50 along slot 53 and within anchored collar 52. This is accomplished by gear 56. Large gear 58 will be described hereinafter in conjunction with FIG. 7. It can be seen that as the restraining plate of constraint 41 moves the spring constant of torsion spring 46 is changed. Thus a variable stiffness torsion spring is shown utilizing a conventional torsion spring.

Figure 7:
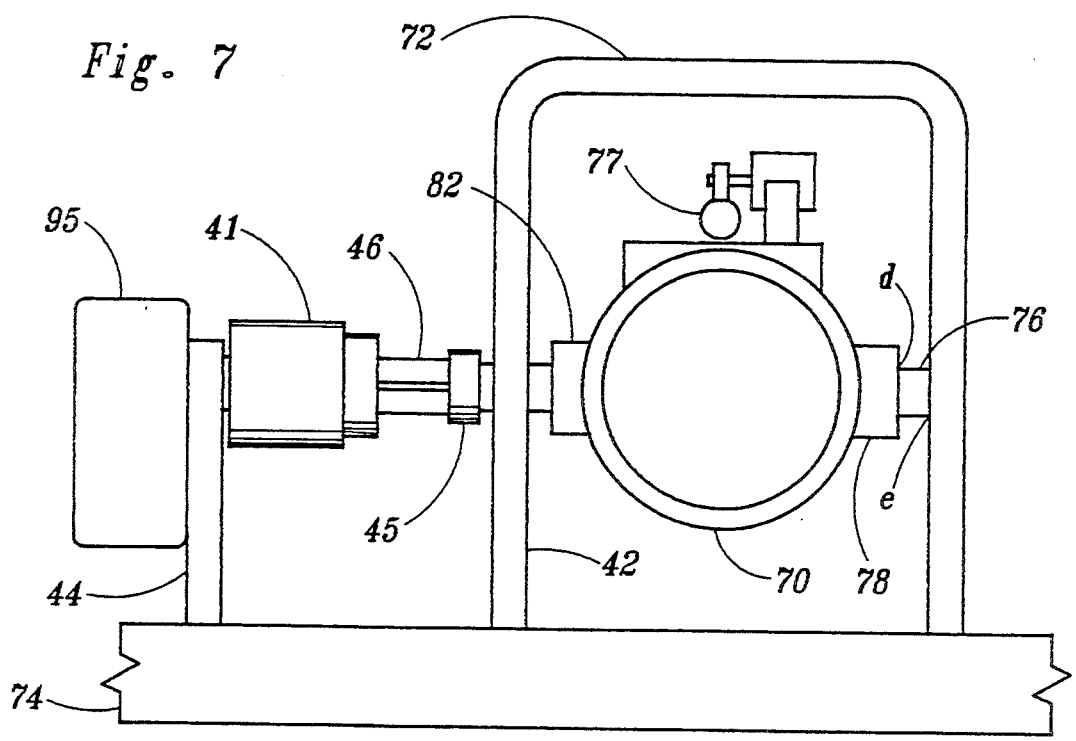
FIG. 7 diagrammatically illustrates the application of the torsion springs in a RUM scanning device.

Having described a variable stiffness torsion spring, we will now illustrate its importance in scanning instruments. In this regard consider the spring described in conjunction with FIG. 4 when it is used in conjunction with a rotating unbalanced mass or RUM device. Such a device is shown in FIG. 7 wherein the parts carry the same numbers used in FIG. 4.

As indicated, scanning is an important aspect of space science. Sensors, telescopes and electronic devices on platforms in space perform important functions in exploration. In using such scanning instruments three general types of scan patterns are well known. The first is a circular scan, in which the line of sight is repeatedly traced in a circle. The second type of scan pattern is a line scan. Here the line-of-sight is linear, with the scanning device line-of-sight moving back and forth in a line. The third form of scan pattern is a raster scan, which is based on a line scan further complemented with some relatively slower motion, usually perpendicular to the original line scan.

To achieve these scan patterns some means must be provided which impart to the payload an oscillatory motion. Although drive means are generally known, a preferred drive means which is particularly effective is a rotating unbalanced mass or RUM device which has been referred to briefly hereinbefore. This RUM device consists of a mass, m, on a lever arm r, located at a distance, d, from the center-of-mass of the gimballed payload on which it is mounted. The mass is driven at a constant angular velocity ω which produces a cyclical centrifugal force mω²r on the payload. This force, in turn, produces a cyclic torque, about the payload center-of-mass, with an amplitude of mω²rd. Two RUM devices are required to scan gimballed payloads. They are mounted on each end of the payload and they rotate 180° out-of-phase producing a cyclic torque couple with an amplitude of 2mω²rd.

The most frequently employed method for achieving the various scan patterns is to gimbal the scanning device. The gimbal or gimbals must be so suspended that they can be actuated to generate the scan pattern. Such a suspension system is provided in my copending patent application Ser. No. 08/123,829. It is a suspension means for payloads rotatably supported in gimbals wherein payload rotation is restricted so that the payload moves in a scan pattern. It includes a gimbal and a payload to be supported in the gimbal. A first axle means has one of its ends attached to one side of the payload and its other end attached to the gimbal. A second axle means has one of its ends attached to the gimbal, and its other end attached to the other side of the payload. The first axle means also has one of its ends journaled to permit payload rotation. The second axle means on the other hand is a pivot, flexible about a torsional moment, but inflexible about bending moments. This construction restricts payload rotation, effecting oscillation of that payload. The rotation of the payload is limited by the torsional spring constant of this flexible pivot. It is this flexible pivot which is replaced by the variable stiffness torsion spring of this invention. Drive mean, of course impart an oscillatory motion to the payload to effect its scan pattern as described in U.S. Pat. No. 5,129,600.

RUM devices require an auxiliary control system to position and reposition the scan pattern relative to a target or a number of targets. The auxiliary control system is also required if a raster scan pattern is to be generated by the RUM device. It confers on the payload a slow complementary motion perpendicular to the line scan to form the raster scan. Such auxiliary control systems are also discussed in my copending patent application.

As indicated, for line and raster scanning, a single gimbal device is necessary. Only on one scan axis is the mechanism provided with a flexible pivot, in this instance a torsion spring, since scanning is performed only in this axis. Any positioning device in the other axis is used only to reposition the scan in this axis and/or to provide the slow complementary motion for raster scanning.

For ease of understanding, then, a single gimbal suspension system for linear scanning is shown in FIG. 7. An instrument or payload 70, preferably a RUM device, is carried by a gimbal 72 through an axle system to be described. For other scan patterns gimbal 72 will be a ring within an outer gimbal. In the embodiment herein the base of the gimbal is embedded in or is part of a platform 74. In order to permit payload movement the axle system includes two axle means. One of the axle means is an axle 76. One side of the payload is attached at d to one end of axle 76. The other end of axle 76 is attached to gimbal 72 at e. To allow movement or rotation of the payload, insofar as possible, axle 76 is journaled in housing 78 holding bearings in a race, not shown.

The other axle means is the torsion spring 41 shown in FIG. 4. Cruciform spring element 46 of FIG. 4 can be seen in FIG. 7. Side 82 of the payload is supported by this torsion spring 41, the spring being that illustrated in FIG. 4. Within gimbal ring 72 are bearings 42 seen in FIG. 4. Unlike axle 76 torsion spring 41 is not journaled or otherwise adapted for rotation. Rather it is firmly secured by constraint unit 41 described in conjunction with FIG. 4, and supported in bearings 44 as shown in FIG. 4.

Figure 6:
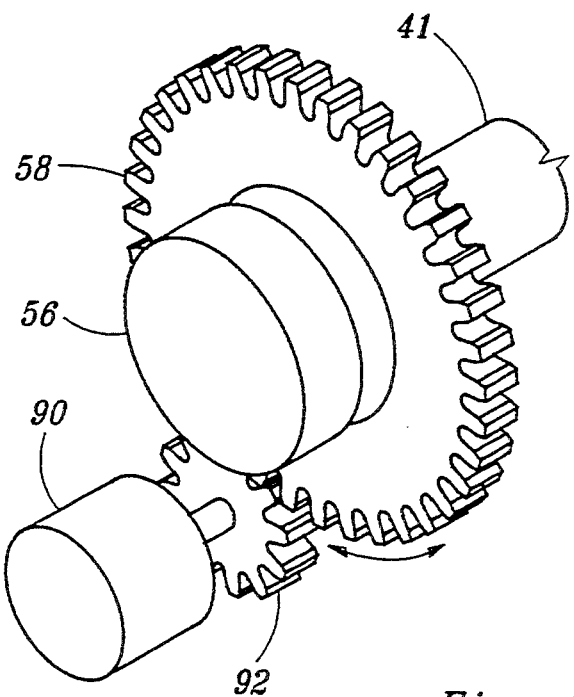
FIG. 6 is an isometric view of a drive means for the embodiment of the invention shown in FIGS. 4 and 7.

During operation the payload must be positioned or repositioned to the center-of-scan in one axis. This positioning means, shown in FIG. 6, in addition to torsion spring 41, includes a stepper motor 90, an N:1 gear train 92, and an encoder 56. Gear train 92 includes large gear 58, mentioned in describing the device shown in FIG. 4, For clarity only a simple one pass gear train is shown. The stepper motor stator is attached to the support structure. The rotor is connected to the low torque side of the gear train and the torsion spring is connected to the high torque side. The other end of the torsion spring is attached to the payload. An encoder is mounted on the high torque side of the gear train to provide a position measurement of the payload center-of-scan. An operator issues step commands to stepper motor 90 until he observes that the measured payload position matches the desired centered position. Stepper motor 90 actuates gear train 92, which in turn partially rotates, or twists torsion spring 41 to position the payload center-of-scan. The payload is now ready for scanning. The RUM devices 77 begin to rotate at a prescribed constant angular velocity, while being maintained 180° out-of-phase with respect to each other. This produces the desired scan.

During scanning, due to the action of the torsion spring and its flexibility in the scan axis, rotation is restricted. In addition, the holding torque of stepper motor 90, amplified by the gear train 92 (FIG. 6), creates a large restoring torque that prevents the center of scan from drifting. In FIG. 7 stepper motor 90, encoder 56 and gears 58 and 92 are contained in housing 95.

RUM devices are superior to previous scanning apparatus in terms of power, weight, cost, and accuracy, but there are still certain disadvantages accompanying their use. Even though power requirements are less than in other scan generating devices there is still room for improvement in the area of power consumption. One way to achieve power savings is through resonance. Even though we have described the torsion springs herein in terms of displacement angles and restoring forces or torque, it is to be noted that this torque gives the spring element an angular acceleration provided we do not exceed the elastic limit of the spring. The ensuing motion is angular simple harmonic motion. As such it is characterized by an amplitude, period and frequency. The torsion spring, then, is an oscillating device. This oscillating frequency $f_p$, coupled with the inertia of the payload $I_p$, is the resonant frequency $f_p$, and $f_p = \sqrt{K_p/I_p}$ where $K_p$ is the torsional spring constant of the torsion spring.

Important herein is the fact that when the resonant frequency matches the scan frequency, amplification can be achieved. In other words, the resonant frequency $f_p$ can be tuned to the scan frequency to amplify the scan. In our copending application this amplification was achieved through use of a flex pivot as illustrated in the following example taken from that application.

EXAMPLE

In this example each RUM has a 5 lb mass on a 0.5 ft lever arm. The RUM torque motor constant is 0.61 ft-lb/$\sqrt{\text{watt}}$. Consequently, 17 watts or less is required to counteract the gravity torque on the RUM mass. If the positioning means of this invention, including the flex pivot, were used in place of the conventional feedback auxiliary control system and the flex pivot amplified the scan by 10×, then the RUM mass will be reduced to 0.5 lb and the power required to counteract the gravity torque to 0.17 watts. Two RUM devices reduce the system weight by 9 lb and the peak power by 34 watts, which are significant where weight and power are critical. Circular scanning using conventional gimbal torques requires 1376 watts in the worst case orientation in one-g. Using RUM devices and a conventional feedback auxiliary control system requires 42 watts. Using RUM devices and the variable-stiffness torsion-spring mechanism described hereinto requires only 8 watts.

It is evident that by the use of a flex pivot RUMs having less mass and smaller sizes could be utilized to achieve the same sized scan. For example, if the flex pivot amplified the scan by 10×, the masses of the RUM devices could be reduced by that factor. The disadvantage of using a flex pivot was that the spring constant of the flex pivot in the scan axis had to be chosen to enhance the operation. This meant that a different flex pivot had to be used for each different scan frequency. This problem has been overcome herein by the use of variable spring constant torsion springs. It is evident that by changing the spring constant through the constraints as described hereinbefore the device can be "tuned" to a resonant frequency at which scanning takes place. The user observes the amplitude of the scan. Its maximum value indicates a torsion spring/inertia condition, that is, in resonance with the scan frequency. This tunability is achieved by the use of a torsion spring having an effective length which can be lengthened or shortened to tune the scan, thus overcoming the use of separate flex pivots for each scan frequency. The invention also allows the scan amplitude to be changed in real time by tuning for more or less scan amplification. In addition, system parameters such as the payload inertia $I_p$ do not have to be accurately known because the tuneable RUM auxiliary control mechanism can compensate for parameter uncertainties.

Another advantage of the tuneable RUM device of this invention is that it acts as a variable frequency isolator that can be tuned to filter mounting base vibrations above a selectable frequency. The device can also be tuned down; that is it can be tuned below or above the resonant frequency. As an example, in some applications, it will be desirable to choose the spring constant of the torsion spring in the scan axis so the resonant frequency, $f_p = \sqrt{K_p/I_p}$ is below the payload scan frequency. This can be readily accomplished by the variable spring constant torsion spring of this invention. When so chosen the torsion spring will not affect the motion created by the RUM devices. It serves only to provide a low-amplitude low-frequency restoring torque to keep the center-of-scan from drifting.

Summarizing, by the practice of this invention RUMs having less mass and smaller sizes can be utilized to achieve the same sized scan. The system uses less system power and mass because it amplifies the scan, allowing smaller RUM masses to achieve the same size scan. It is cheaper and less complicated, and its use leads to less chance of a stability problem because there is no feedback controller. It also allows mounting base disturbance vibrations above the resonant frequency of the torsion spring/inertial to be isolated from the payload.

The device of the invention not only amplifies the scan pattern, allowing smaller RUM devices requiring less power to be used, but it permits open loop operation for positioning/repositioning the scan to keep it from drifting.

Having been given the teachings of this invention, variations and ramifications will occur to those skilled in the art. It will be appreciated, for instance that external springs taking forms other than those shown in FIG. 1 can be used to return a torsion bar. As another variation rollers can be incorporated in supporting blocks 10 and 12 (FIG. 1) for ease of operation as blades 6 and 8 flex and move in the slots in the blocks. In addition constraints other than the cylindrical collar shown in FIG. 4 will occur to those skilled in the art. Various clamps and grippers are available. This is also true of the gear shown in FIG. 2. Other gears can be used for the purpose of moving constraints 21 and 22. In fact they could be moved manually by means of a knob and the like. Further, as set forth in our copending application two gimbals and two positioning means can be employed, and each positioning means will have its torsion spring. Moreover, to maximize the scan amplitude adjustable trim masses on lead screws can be used as disclosed in our copending application. This is also true of the linear viscosity-coupled inertial dampers and the feedback controller discussed in our copending application. Such ramifications as these are, of course, within the scope of this invention.

What is claimed is:

1. Suspension means for payloads rotatably supported in gimbals wherein payload rotation is restricted so that the payload moves in a scan pattern, comprising a gimbal, a payload to be supported in the gimbal, a first axle means having one end attached to one side of the payload and its other end attached to the gimbal, a second axle means having one end attached to the gimbal, and its other end attached to the other side of the payload, the first axle means having one of its ends journaled to permit payload rotation, the second axle means being a the torsion spring flexible about a torsional moment, but inflexible about bending moments to restrict said rotation, drive means effecting rotation of the payload, the rotation of the payload being limited by the torsional spring constant of the torsion spring so that the drive means imparts only an oscillatory motion to the payload to effect its scan pattern, positioning means coupled with the torsion spring, the positioning means being adapted to hold the torsion spring in a fixed position and to twist the torsion spring when the positioning means are actuated.

2. A suspension system for payloads rotatably supported in gimbals wherein payload rotation is restricted so that the payload moves in a scan pattern, comprising a gimbal, a payload to be supported in the gimbal, a first axle means having one end attached to one side of the payload and its other end attached to the gimbal, a second axle means having one end attached to the gimbal, and its other end attached to the other side of the payload, the first axle means having one of its ends journaled to permit payload rotation, the second axle means being a torsion spring flexible about a torsional moment, but inflexible about bending moments to restrict said rotation, drive means effecting rotation of the payload, the rotation of the payload being limited by the torsional spring constant of the torsion spring so that the drive means imparts only an oscillatory motion to the payload to effect its scan pattern, positioning means coupled with the torsion spring, the positioning means being adapted to hold the torsion spring in a fixed position and to twist the torsion spring when the positioning means are actuated.

3. The suspension means of claim 2 wherein the payload is supported in a single gimbal and the positioning means is a stepper motor.

4. The suspension system of claim 2 wherein the positioning means is moveable axially relative to the torsion spring to change the effective length of said spring.

5. The system of claim 4 wherein the torsion spring has a cruciform cross section.

6. A system for supporting a payload to be scanned in a scanning pattern, comprising
   a. a platform,
   b. a gimbal supported by the platform,
   c. a first axle positioned on one side of the payload for supporting the payload on the gimbal,
   d. a second axle positioned on the other side of the payload for supporting the payload on the gimbal, said axles being coaxial,
   e. an elongated torsion spring having one end thereof connected to one of the axles such that the spring is flexed when the payload in scanned about the axis of the axles, and
   f. means supported by the platform for holding the other end of the torsion spring to cause said flexing to occur between said holding means and said one end of said spring.

7. The system of claim 6 wherein the holding means is moveable relative to the platform to change the effective length of the torsion spring to thereby change the spring constant of said spring.

8. The system of claim 7 wherein the torsion spring has a cruciform-cross section.

9. The system of claim 7 wherein the torsion spring is in the form of a leaf spring having one end thereof secured to one of said axles and the other end extending transversely away from said axle, said holding means holding the other end of said spring at a position spaced transversely from said axle, said holding means being moveable toward and away from said axle to change the effective length of said spring.

* * * * *